United States Patent
Matsui

(10) Patent No.: US 11,906,008 B2
(45) Date of Patent: Feb. 20, 2024

(54) BRAKE PAD STATE ESTIMATION DEVICE AND BRAKE PAD STATE ESTIMATION METHOD

(71) Applicant: Toyota Jidosha Kabushiki Kaisha, Toyota (JP)

(72) Inventor: Noriyoshi Matsui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 17/351,479

(22) Filed: Jun. 18, 2021

(65) Prior Publication Data
US 2022/0018413 A1  Jan. 20, 2022

(30) Foreign Application Priority Data

Jul. 17, 2020  (JP) .................................. 2020-123173

(51) Int. Cl.
*F16D 66/02* (2006.01)
*B60T 17/22* (2006.01)
*F16D 66/00* (2006.01)

(52) U.S. Cl.
CPC .......... *F16D 66/021* (2013.01); *B60T 17/221* (2013.01); *F16D 66/00* (2013.01); *B60T 2250/04* (2013.01); *B60T 2270/88* (2013.01); *F16D 2066/001* (2013.01); *F16D 2066/006* (2013.01)

(58) Field of Classification Search
None
See application file for complete search history.

(56) References Cited

U.S. PATENT DOCUMENTS

| | | | | |
|---|---|---|---|---|
| 2008/0236269 | A1* | 10/2008 | Howell | B60T 17/221 73/121 |
| 2015/0120163 | A1* | 4/2015 | Ohara | F16D 65/18 701/70 |
| 2016/0138665 | A1* | 5/2016 | Antanaitis | B60T 17/22 701/70 |
| 2017/0335912 | A1* | 11/2017 | Koh | F16D 66/022 |

(Continued)

FOREIGN PATENT DOCUMENTS

| | | |
|---|---|---|
| JP | 2005-067508 A | 3/2005 |
| JP | 2015-041304 A | 3/2015 |
| JP | 6207075 B2 | 10/2017 |

*Primary Examiner* — Amelia Vorce
(74) *Attorney, Agent, or Firm* — Dinsmore & Shohl LLP

(57) ABSTRACT

A brake pad state estimation device estimates a brake pad state including at least one of a wear volume and a temperature of a brake pad of a vehicle. The brake pad state estimation device performs: a brake pad state calculation process calculating the brake pad state based on sensor detection information during braking; and an information output process storing the brake pad state information in a storage and/or transmitting the brake pad state information to the outside. The brake pad state estimation device variably sets a processing frequency of at least one of the brake pad state calculation process and the information output process. The processing frequency when a vehicle speed is lower is lower than the processing frequency when the vehicle speed is higher, or the processing frequency when a brake pressure is lower is lower than the processing frequency when the brake pressure is higher.

8 Claims, 9 Drawing Sheets

10: BRAKING DEVICE

(56) References Cited

U.S. PATENT DOCUMENTS

| | | | |
|---|---|---|---|
| 2018/0257620 A1* | 9/2018 | Crossman | B60T 8/4031 |
| 2019/0107163 A1* | 4/2019 | Medinei | F16D 66/026 |
| 2019/0234475 A1* | 8/2019 | Hall | F16D 66/027 |
| 2020/0102993 A1* | 4/2020 | Antanaitis | B60T 17/22 |

* cited by examiner

BRAKE PAD STATE ESTIMATION DEVICE AND BRAKE PAD STATE ESTIMATION METHOD

CROSS-REFERENCE TO RELATED APPLICATION

The present disclosure claims priority under 35 U.S.C. § 119 to Japanese Patent Application No. 2020-123173, filed Jul. 17, 2020, the contents of which application are incorporated herein by reference in their entirety.

BACKGROUND

Technical Field

The present disclosure relates to a technique of estimating a brake pad state including at least one of a wear volume and a temperature of a brake pad of a vehicle.

Background Art

Japanese Patent No. 6207075 discloses a wear volume computation device that calculates a wear volume of a braking member of a railroad car and the like. The wear volume computation device calculates (estimates) the wear volume of the braking member based on a brake pressure, a speed of a braking target, and a braking time.

Japanese Laid-Open Patent Application Publication No. 2005-067508 discloses a wear alert system. The wear alert system estimates a wear volume of a brake pad by using an on-board sensor, and outputs a wear alarm according to a result of the estimation.

Japanese Laid-Open Patent Application Publication No. 2015-041304 discloses a method of calculating a wear volume based on a wear rate of a brake pad. The wear rate of the brake pad is a constant which depends on a temperature and a material of the brake pad, and is calculated from a characteristics table.

SUMMARY

During braking of a vehicle, a braking force is generated by pressing a brake pad against a brake rotor rotating with a wheel. At this time, the brake pad is worn by friction between the brake pad and the brake rotor. Estimating a wear volume of the brake pad is important for predicting decrease in a brake performance. The wear volume of the brake pad per unit input (i.e., per single braking) depends on a vehicle speed, a brake pressure, and the like. It is therefore possible to estimate (calculate) the wear volume based on the vehicle speed and the brake pressure.

Moreover, wear characteristics of the brake pad also depend on a temperature of a contact surface (friction part) that comes in contact with the brake rotor. The wear volume tends to be higher as the temperature of the contact surface becomes higher. Therefore, estimating the temperature of the contact surface of the brake pad also is important for predicting decrease in the brake performance. As in the case of the wear volume, the temperature of the contact surface depends on the vehicle speed, the brake pressure, and the like. It is therefore possible to estimate (calculate) the temperature of the contact surface based on the vehicle speed and brake pressure.

As described above, a "brake pad state" such as the wear volume and the temperature of the brake pad is calculated based on the vehicle speed and the brake pressure. The vehicle speed and the brake pressure are detected by sensors installed on the vehicle. In general, a sampling period of the sensor signal is very short and thus the amount of sensor detection information becomes enormous. Accordingly, the process of continuously calculating the brake pad state based on the sensor detection information is likely to consume a considerable amount of computational resources. Moreover, a process of continuously storing a result of calculation of the brake pad state in a storage device is likely to consume a considerable amount of storage resources. Furthermore, a process of continuously transmitting the result of calculation of the brake pad state to the outside is likely to consume a considerable amount of communication resources.

An object of the present disclosure is to provide a technique that can suppress unnecessary consumption of at least one of a computational resource, a storage resource, and a communication resource, when estimating a brake pad state including at least one of a wear volume and a temperature of a brake pad of a vehicle.

A first aspect is directed to a brake pad state estimation device that estimates a brake pad state including at least one of a wear volume and a temperature of a brake pad of a vehicle.

The brake pad state estimation device includes a processor and a storage.

The processor is programmed to execute:
- an information acquisition process acquiring sensor detection information that includes a vehicle speed and a brake pressure detected by a sensor installed on the vehicle;
- a brake pad state calculation process calculating the brake pad state based on the sensor detection information during braking of the vehicle;
- an information output process storing a result of calculation of the brake pad state in the storage and/or transmitting the result of calculation of the brake pad state to an outside of the vehicle; and
- processing frequency control that variably sets a processing frequency of at least one of the brake pad state calculation process and the information output process.

In the processing frequency control, the processor is further programmed to set the processing frequency in a case where the vehicle speed is lower to be lower than the processing frequency in a case where the vehicle speed is higher, or to set the processing frequency in a case where the brake pressure is lower to be lower than the processing frequency in a case where the brake pressure is higher.

A second aspect is directed to a brake pad state estimation method that estimates a brake pad state including at least one of a wear volume and a temperature of a brake pad of a vehicle.

The brake pad state estimation method includes:
- an information acquisition process acquiring sensor detection information that includes a vehicle speed and a brake pressure detected by a sensor installed on the vehicle;
- a brake pad state calculation process calculating the brake pad state based on the sensor detection information during braking of the vehicle;
- an information output process storing a result of calculation of the brake pad state in the storage and/or transmitting the result of calculation of the brake pad state to an outside of the vehicle; and
- processing frequency control that variably sets a processing frequency of at least one of the brake pad state calculation process and the information output process.

In the processing frequency control, the processing frequency in a case where the vehicle speed is lower is set to be lower than the processing frequency in a case where the vehicle speed is higher, or the processing frequency in a case where the brake pressure is lower is set to be lower than the processing frequency in a case where the brake pressure is higher.

According to the present disclosure, the processing frequency of at least one of the brake pad state calculation process and the information output process is variably set. More specifically, the processing frequency in the case where the vehicle speed is lower is set to be lower than the processing frequency in the case where the vehicle speed is higher, or the processing frequency in the case where the brake pressure is lower is set to be lower than the processing frequency in the case where the brake pressure is higher.

That is, the processing frequency is set to be low in a case where an impact on the brake performance is low, and the processing frequency is set to be high in a case where the impact on the brake performance is high. It is thus possible to suppress the resource consumption in the case where the impact on the brake performance is low, and to calculate the brake pad state more precisely in the case where the impact on the brake performance is high. In other words, it is possible to efficiently secure an estimation accuracy of the brake pad state without consuming resources more than necessary.

EMBODIMENTS

Embodiments of the present disclosure will be described below with reference to the attached drawings.

1. Outline 1-1. Vehicle and Braking Device

Figure 1:
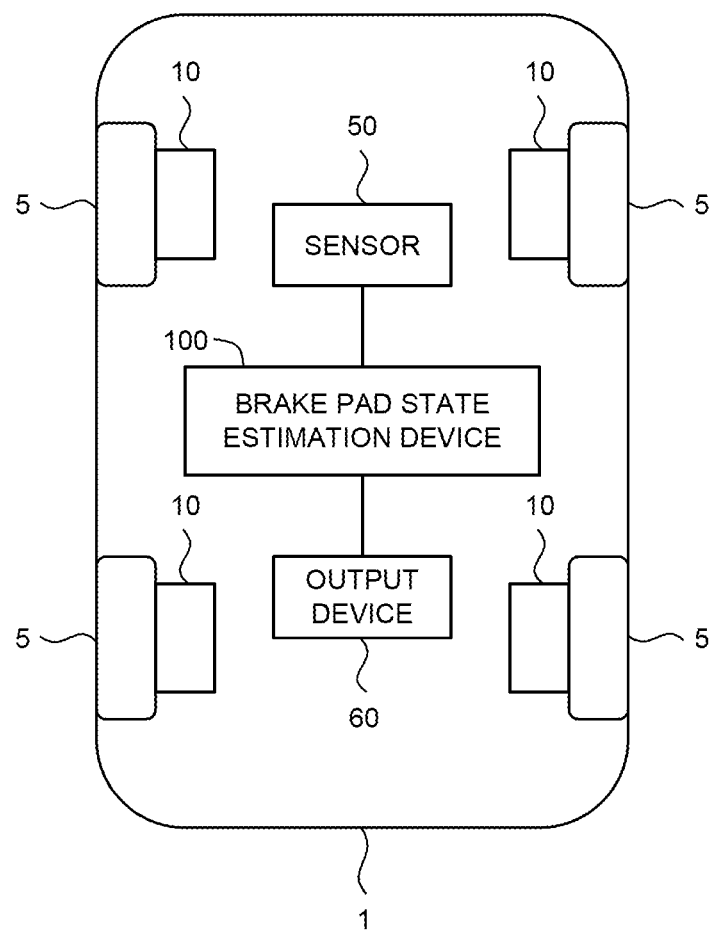
FIG. 1 is a schematic diagram showing a configuration of a vehicle according to an embodiment of the present disclosure.

FIG. 1 is a schematic diagram showing a configuration of a vehicle 1 according to the present embodiment. The vehicle 1 may be an automated driving vehicle controlled by an automated driving system. The vehicle 1 includes a wheel (tire) 5 and a braking device 10. The braking device 10 generates a braking force in response to a brake operation by a driver or the automated driving system.

Figure 2:
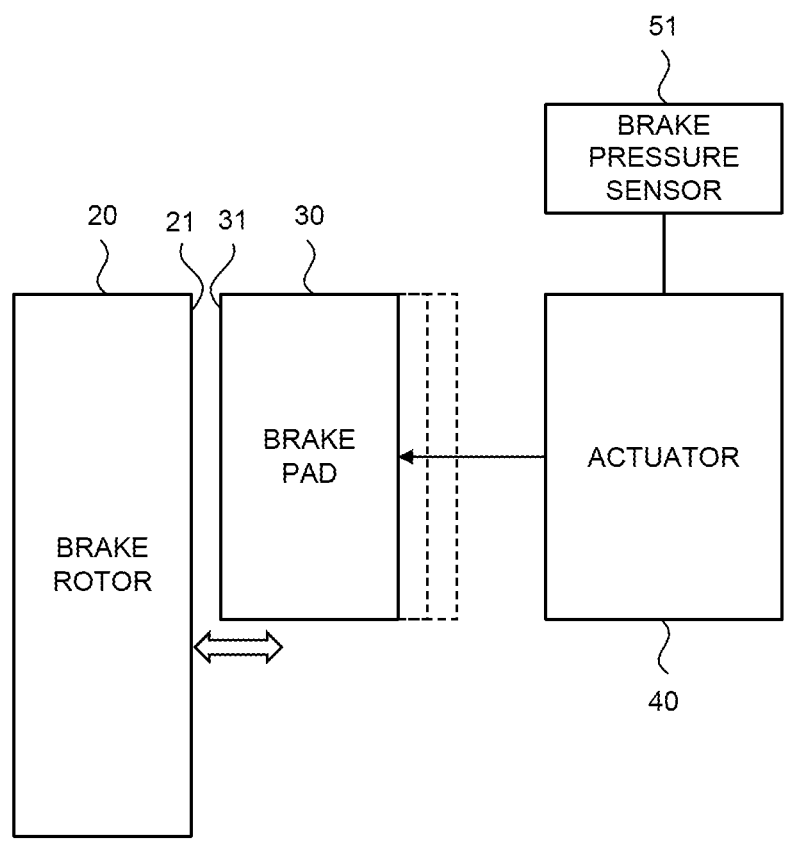
FIG. 2 is a block diagram schematically showing a configuration of a braking device according to an embodiment of the present disclosure.

FIG. 2 is a block diagram schematically showing a configuration of the braking device 10 according to the present embodiment. The braking device 10 includes a brake rotor 20, a brake pad 30, and an actuator 40.

The brake rotor 20 is a rotatable member that rotates with the wheel 5. For example, a material of the brake rotor 20 is cast iron. The brake pad 30 is a friction material that comes in contact with the brake rotor 20. For example, the brake pad 30 is formed by baking and solidifying a composite material including various organic fibers and inorganic fibers with a resin.

The actuator 40 moves and presses the brake pad 30 against the brake rotor 20 in response to the brake operation by the driver or the automated driving system. More specifically, the actuator 40 generates a brake pressure Pb in response to the brake operation and presses the brake pad 30 against the brake rotor 20 by the brake pressure Pb. For example, the actuator 40 includes a master cylinder and a caliper. In response to the brake operation, the master cylinder pushes brake fluid out to the caliper to generate the brake pressure (brake fluid pressure) Pb. The brake pressure Pb causes a piston in the caliper to push the brake pad 30 and push it against the brake rotor 20. As a result, the braking force is generated.

A brake pressure sensor 51 detects the brake pressure (brake fluid pressure) Pb.

During braking of the vehicle 1, the braking force is generated by pressing the brake pad 30 against the brake rotor 20 rotating with the wheel 5. At this time, a surface of the brake rotor 20 and a surface of the brake pad 30 come in contact with each other. The surface of the brake rotor 20 that comes in contact with the brake pad 30 is hereinafter referred to as a "contact surface 21." Similarly, the surface of the brake pad 30 that comes in contact with the brake rotor 20 is hereinafter referred to as a "contact surface 31." Due to friction between the contact surface 21 and the contact surface 31, the contact surface 31 of the brake pad 30 is worn. Estimating a wear volume of the brake pad 30 is important for predicting decrease in a brake performance.

1-2. Wear Volume Estimation

A wear volume W of the brake pad 30 per unit of input (i.e., per single braking) depends on a vehicle speed V, the brake pressure Pb, and a brake duration tb. The vehicle speed V is a rotational speed of the wheel 5 (i.e., a wheel speed). The brake duration tb is a duration in which the brake pressure Pb (i.e., the braking force) is generated. The wear volume W increases as the vehicle speed V becomes higher.

The wear volume W increases as the brake pressure Pb becomes higher. The wear volume W increases as the brake duration tb becomes longer. That is, the wear volume W is expressed by the following Equation (1).

$$W = f(V, Pb, tb) \quad \text{Equation (1):}$$

A wear volume function f expresses the wear volume W as a function of the vehicle speed V, the brake pressure Pb, and the brake duration tb. The wear volume function f is a formula or a map designed in advance. The wear volume function f is designed so that the wear volume W increases as the vehicle speed V becomes higher. Similarly, the wear volume function f is designed so that the wear volume W increases as the brake pressure Pb becomes higher. In addition, the wear volume function f is designed so that the wear volume W increases as the brake duration tb becomes longer. Using the wear volume function f makes it possible to calculate (estimate) the wear volume W according to the vehicle speed V, the brake pressure Pb, and the brake duration tb.

1-3. Temperature Estimation

During the braking of the vehicle 1, frictional heat is generated due to the friction between the brake rotor 20 and the brake pad 30. Due to the frictional heat, a physical property of the material of the brake pad 30 irreversibly changes. For example, when the brake pad 30 includes a resin, the resin decomposes, melts, and vaporizes at a high temperature condition. As a result, the contact surface 31 of the brake pad 30 becomes brittle and easy to shave.

As described above, wear characteristics of the brake pad 30 also depend on a temperature Te of the contact surface 31 (i.e., the friction part). The wear volume W tends to be higher as the temperature Te of the contact surface 31 becomes higher. Therefore, estimating the temperature Te of the contact surface 31 also is important for predicting decrease in the brake performance.

The temperature Te of the contact surface 31 increases as the frictional heat between the brake rotor 20 and the brake pad 30 increases. Therefore, the temperature Te of the contact surface 31 becomes higher as the vehicle speed V becomes higher. The temperature Te of the contact surface 31 becomes higher as the brake pressure Pb becomes higher. The temperature Te of the contact surface 31 becomes higher as the brake duration tb becomes longer. That is, the temperature Te of the contact surface 31 is expressed by the following Equation (2).

$$Te = g(V, Pb, tb) \quad \text{Equation (2):}$$

A temperature function g expresses the temperature Te of the contact surface 31 as a function of the vehicle speed V, the brake pressure Pb, and the brake duration tb. The temperature function g is a formula or a map designed in advance. The temperature function g is designed so that the temperature Te increases as the vehicle speed V becomes higher. Similarly, the temperature function g is designed so that the temperature Te increases as the brake pressure Pb becomes higher. In addition, the temperature function g is designed so that the temperature Te increases as the brake duration tb becomes longer. Using the temperature function g makes it possible to calculate (estimate) the temperature Te of the contact surface 31 according to the vehicle speed V, the brake pressure Pb, and the brake duration tb.

1-4. Brake Pad State Estimation Device

A brake pad state estimation device 100 shown in FIG. 1 estimates (calculates) a "brake pad state ST" during the braking of the vehicle 1. Here, the "brake pad state ST" includes at least one of the wear volume W and the temperature Te of the brake pad 30 described above.

More specifically, the brake pad state estimation device 100 acquires sensor detection information that is detected by a sensor 50 installed on the vehicle 1. The sensor 50 includes the brake pressure sensor 51 that detects the brake pressure Pb and a wheel speed sensor that detects the vehicle speed V. The sensor detection information includes the vehicle speed V and the brake pressure Pb detected by the sensor 50. The brake duration tb can be acquired from a time during which the brake pressure Pb is generated.

The brake pad state estimation device 100 calculates the brake pad state ST based on the sensor detection information. More specifically, the brake pad state estimation device 100 calculates the brake pad state ST according to the vehicle speed V, the brake pressure Pb, and the brake duration tb by using the wear volume function f and/or the temperature function g.

The brake pad state estimation device 100 calculates the brake pad state ST for each brake operation. Then, the brake pad state estimation device 100 accumulates the result of calculation of the brake pad state ST in a storage device. For example, the brake pad state estimation device 100 continuously calculates the wear volume W of the brake pad 30, and accumulates information of the wear volume W and a cumulative wear volume Wt in the storage device. If the cumulative wear volume Wt exceeds a threshold, the brake pad state estimation device 100 may output an alert through an output device 60 (e.g., a display, a speaker).

Typically, the brake pad state estimation device 100 is installed on the vehicle 1. Alternatively, the brake pad state estimation device 100 may be placed outside the vehicle 1 and remotely estimate the brake pad state ST. In this case, the brake pad state estimation device 100 communicates with the vehicle 1 to acquire the sensor detection information detected by the sensor 50 installed on the vehicle 1.

When the brake pad state estimation device 100 is installed on the vehicle 1, the brake pad state estimation device 100 may transmit information on the result of calculation of the brake pad state ST to an external device (e.g., a management server) outside the vehicle 1. In this case, the output device 60 installed on the vehicle 1 includes a communication device, and the information of the brake pad state ST is transmitted through the communication device.

A process that the brake pad state estimation device 100 calculates the brake pad state ST is hereinafter referred to as a "brake pad state calculation process." A process that the brake pad state estimation device 100 stores the result of calculation of the brake pad state ST in a storage device and/or transmits the result of calculation of the brake pad state ST to the outside of vehicle 1 is hereinafter referred to as an "information output process."

1-5. Processing Frequency Control

In general, a sampling period of the sensor signal is very short and thus the amount of sensor detection information becomes enormous. Accordingly, the brake pad state calculation process that continuously calculates the brake pad state ST based on the sensor detection information is likely to consume a considerable amount of computational resources. Moreover, the information output process that continuously outputs information of the brake pad state ST is likely to consume a considerable amount of storage resources and/or communication resources.

In view of the above, according to the present embodiment, "processing frequency control" is executed in order to suppress unnecessary consumption of at least one of the computational resource, the storage resource, and the communication resource. In the processing frequency control, the brake pad state estimation device 100 variably sets a processing frequency FP of at least one of the brake pad state calculation process and the information output process depending on a situation.

More specifically, the processing frequency FP is set to be relatively low in a situation where the wear volume W of the brake pad 30 is expected to be relatively low or the temperature Te is expected to be relatively low. Conversely, the processing frequency FP is set to be relatively high in a situation where the wear volume W of the brake pad 30 is expected to be relatively high or the temperature Te is expected to be relatively high. That is to say, the processing frequency FP is set to be low in a case where an impact on the brake performance is low, and the processing frequency FP is set to be high in a case where the impact on the brake performance is high. It is thus possible to suppress the resource consumption in the case where the impact on the brake performance is low, and to calculate the brake pad state ST more precisely in the case where the impact on the brake performance is high. In other words, it is possible to efficiently secure an estimation accuracy of the brake pad state ST without consuming resources more than necessary.

Figure 3:
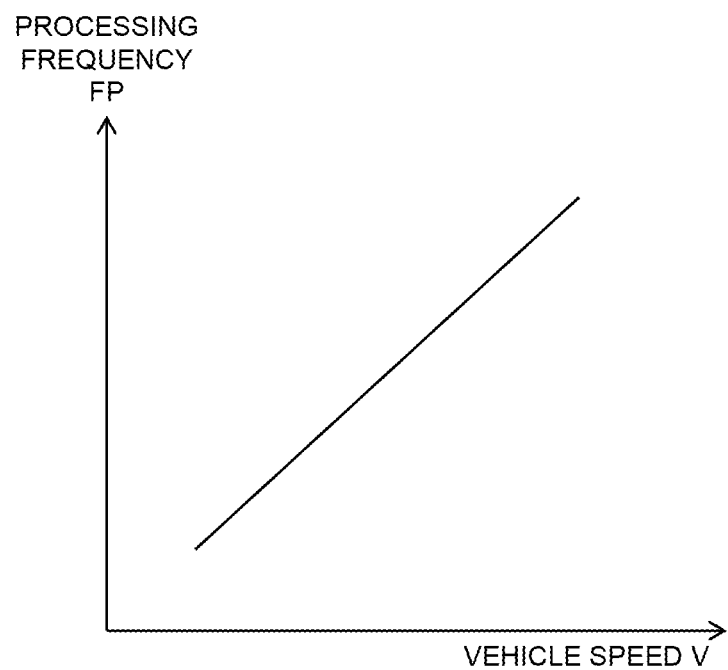
FIG. 3 is a conceptual diagram showing an example of variable setting of a processing frequency according to an embodiment of the present disclosure.

FIG. 3 is a conceptual diagram showing an example of the variable setting of the processing frequency FP according to the present embodiment. A horizontal axis represents the vehicle speed V detected by the sensor 50, and the vertical axis represents the processing frequency FP. As described above, the wear volume W increases and the temperature Te becomes higher as the vehicle speed V becomes higher. That is, the impact on the brake performance becomes higher as the vehicle speed V becomes higher. Therefore, the processing frequency FP in a case where the vehicle speed V is relative low is set to be relatively low, and the processing frequency FP in a case where the vehicle speed V is relatively high is set to be relatively high. In the example shown in FIG. 3, the processing frequency FP becomes lower as the vehicle speed V becomes lower, and the processing frequency FP becomes higher as the vehicle speed V becomes higher. It should be noted that the processing frequency FP does not necessarily required to change monotonically. For example, the processing frequency FP may change in a stepwise manner.

Figure 4:
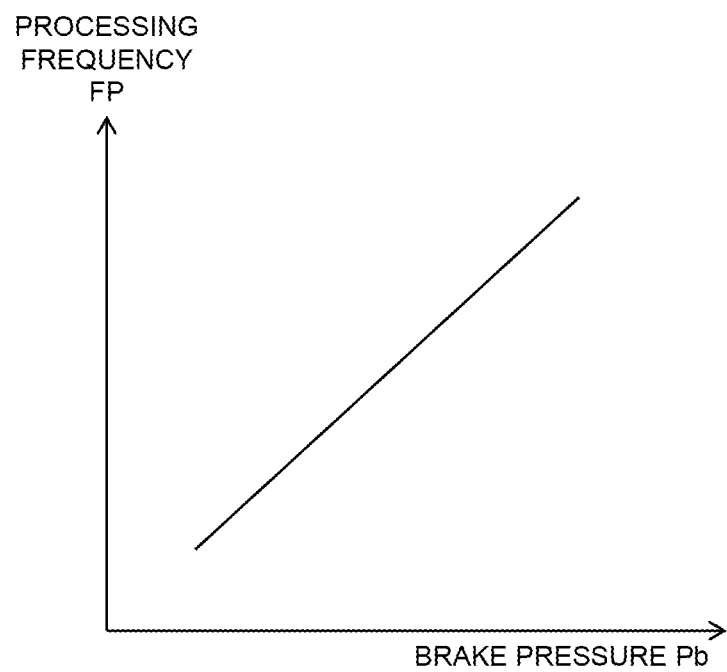
FIG. 4 is a conceptual diagram showing another example of variable setting of a processing frequency according to an embodiment of the present disclosure.

FIG. 4 is a conceptual diagram showing another example of the variable setting of the processing frequency FP according to the present embodiment. A horizontal axis represents the brake pressure Pb detected by the sensor 50, and the vertical axis represents the processing frequency FP. As described above, the wear volume W increases and the temperature Te becomes higher as the brake pressure Pb becomes higher. That is, the impact on the brake performance becomes higher as the brake pressure Pb becomes higher. Therefore, the processing frequency FP in a case where the brake pressure Pb is relative low is set to be relatively low, and the processing frequency FP in a case where the brake pressure Pb is relatively high is set to be relatively high. In the example shown in FIG. 4, the processing frequency FP becomes lower as the brake pressure Pb becomes lower, and the processing frequency FP becomes higher as the brake pressure Pb becomes higher. It should be noted that the processing frequency FP does not necessarily required to change monotonically. For example, the processing frequency FP may change in a stepwise manner.

In this manner, at least one of the vehicle speed V and the brake pressure Pb detected by the sensor 50 is associated with the processing frequency FP. The brake pad state estimation device 100 acquires the sensor detection information, and acquires the processing frequency FP associated with at least one of the vehicle speed V and the brake pressure Pb. Then, the brake pad state estimation device 100 executes at least one of the brake pad state calculation process and the information output process with the acquired processing frequency FP.

According to the present embodiment, as described above, the processing frequency FP of at least one of the brake pad state calculation process and the information output process is variably set depending on a situation. More specifically, the processing frequency FP in the case where the vehicle speed V is lower is set to be lower than the processing frequency FP in the case where the vehicle speed V is higher, or the processing frequency FP in the case where the brake pressure Pb is lower is set to be lower than the processing frequency FP in the case where the brake pressure Pb is higher.

That is, the processing frequency FP is set to be low in the case where the impact on the brake performance is low, and the processing frequency FP is set to be high in the case where the impact on the brake performance is high. It is thus possible to suppress the resource consumption in the case where the impact on the brake performance is low, and to calculate the brake pad state ST more precisely in the case where the impact on the brake performance is high. In other words, it is possible to efficiently secure an estimation accuracy of the brake pad state ST without consuming resources more than necessary.

Hereinafter, the brake pad state estimation device 100 according to the present embodiment will be described in more detail.

2. Brake Pad State Estimation Device 2-1. Configuration Example

Figure 5:
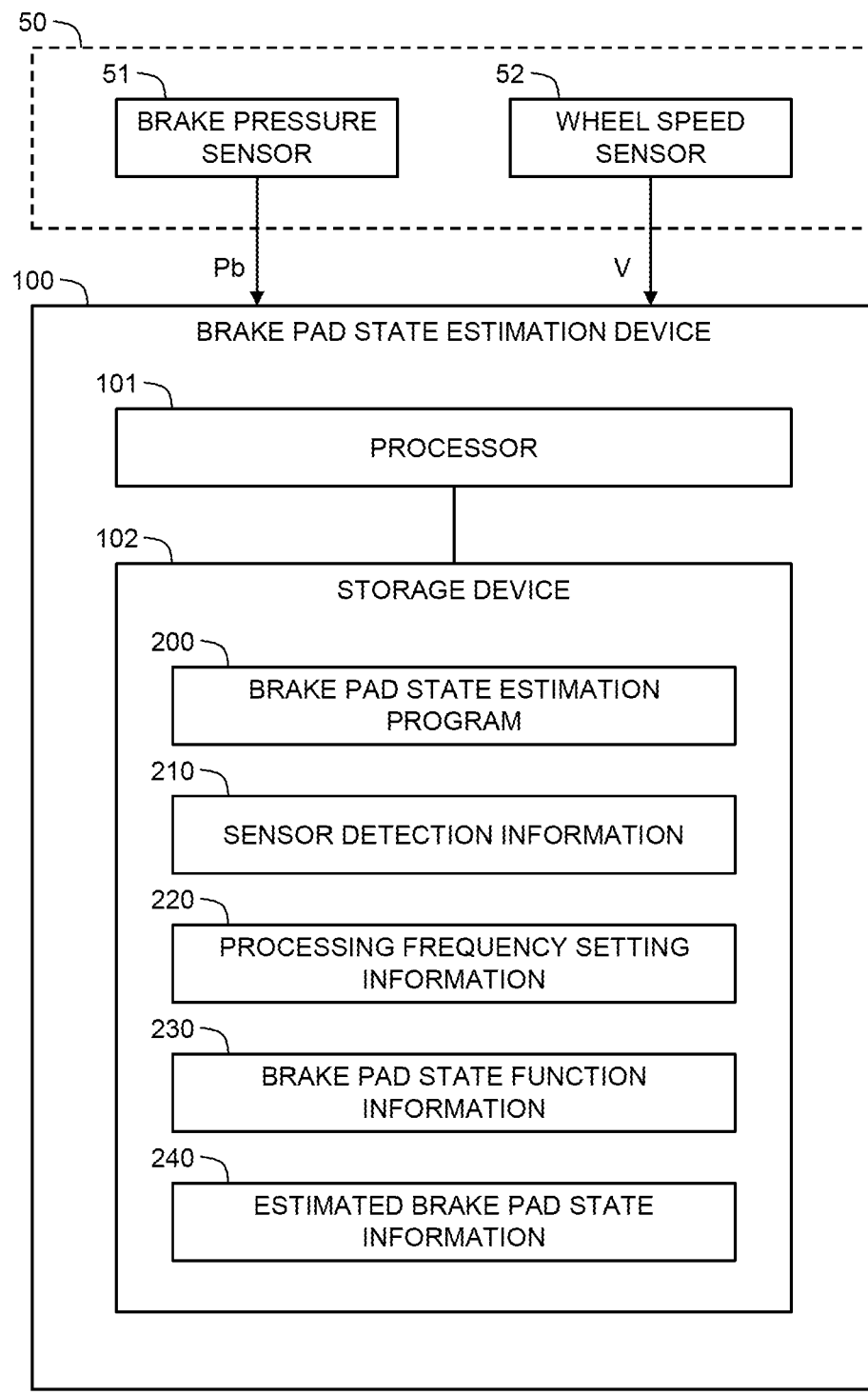
FIG. 5 is a block diagram showing a configuration example of a brake pad state estimation device according to an embodiment of the present disclosure.

FIG. 5 is a block diagram showing a configuration example of the brake pad state estimation device 100 according to the present embodiment. The brake pad state estimation device 100 is a computer that executes a variety of information processing. The brake pad state estimation device 100 includes a processor 101 and a storage device 102. The processor 101 executes a variety of information processing. For example, the processor 101 includes a CPU (Central Processing Unit). The storage device 102 stores a variety of information necessary for the processing by the processor 101. Examples of the storage device 102 include a volatile memory, a nonvolatile memory, an HDD (Hard Disk Drive), an SSD (Solid State Drive), and the like.

The brake pad state estimation device 100 may be included in an ECU (Electronic Control Unit) that controls the vehicle 1.

2-2. Brake Pad State Estimation Program

A brake pad state estimation program 200 is a computer program executed by a computer. The functions of the brake pad state estimation device 100 (the processor 101) is implemented by the processor 101 executing the brake pad state estimation program 200. The brake pad state estimation program 200 is stored in the storage device 102. The brake pad state estimation program 200 may be recorded on a computer-readable recording medium. The brake pad state estimation program 200 may be provided through a network.

2-3. Sensor Detection Information

Sensor detection information 210 is information detected by the sensor 50 installed on the vehicle 1. The sensor 50 includes the brake pressure sensor 51 and a wheel speed sensor 52. The brake pressure sensor 51 detects the brake pressure Pb. The wheel speed sensor 52 detects the vehicle speed V. The sensor detection information 210 includes the vehicle speed V, the brake pressure Pb, and the brake duration tb. The brake duration tb can be acquired from a time during which the brake pressure Pb is generated. The processor 101 acquires the sensor detection information 210 based on the result of detection by the sensor 50. The sensor detection information 210 is stored in the storage device 102.

2-4. Processing Frequency Setting Information

Processing frequency setting information 220 associates at least one of the vehicle speed V and the brake pressure Pb with the processing frequency FP (see FIGS. 3 and 4). The processing frequency setting information 220 is a formula or a map designed in advance. For example, the processing frequency setting information 220 is designed such that the processing frequency FP in the case where the vehicle speed V is lower is lower than the processing frequency FP in the case where the vehicle speed V is higher (see FIG. 3). As another example, the processing frequency setting information 220 is designed such that the processing frequency FP in the case where the brake pressure Pb is lower is lower than the processing frequency FP in the case where the brake pressure Pb is higher (see FIG. 4). The processing frequency setting information 220 is stored in advance in the storage device 102.

2-5. Brake Pad State Function Information

Brake pad state function information 230 indicates the wear volume function f and/or the temperature function g. The brake pad state function information 230 is stored in advance in the storage device 102.

The wear volume function f expresses the wear volume W of the brake pad 30 as a function of the vehicle speed V, the brake pressure Pb, and the brake duration tb (see the above Equation (1)). The wear volume W increases as the vehicle speed V becomes higher. The wear volume W increases as the brake pressure Pb becomes higher. The wear volume W increases as the brake duration tb becomes longer. The wear volume function f may be a formula or may be a map. The wear volume function f is designed in advance based on actual measurements of the vehicle speed V, the brake pressure Pb, the brake duration tb, and the wear volume W.

The temperature function g expresses the temperature Te of the contact surface 31 as a function of the vehicle speed V, the brake pressure Pb, and the brake duration tb (see the above Equation (2)). The temperature Te increases as the vehicle speed V becomes higher. The temperature Te increases as the brake pressure Pb becomes higher. The temperature Te increases as the brake duration tb becomes longer. The temperature function g may be a formula or may be a map designed in advance. The temperature function g is designed in advance based on actual measurements of vehicle speed V, the brake pressure Pb, the brake duration tb, and the temperature Te.

2-6. Estimated Brake Pad State Information

Estimated brake pad state information 240 indicates the brake pad state ST that is estimated (calculated) by the brake pad state estimation device 100 (i.e., the processor 101). The brake pad state ST includes at least one of the wear volume W and the temperature Te of the brake pad 30. The estimated brake pad state information 240 may indicate the cumulative wear volume Wt which is an integrated value of the wear volume W. The estimated brake pad state information 240 is stored in the storage device 102.

3. Examples of Processing by Brake Pad State Estimation Device

Hereinafter, examples of processing by the brake pad state estimation device 100 according to the present embodiment will be described.

3-1. First Processing Example

Figure 6:
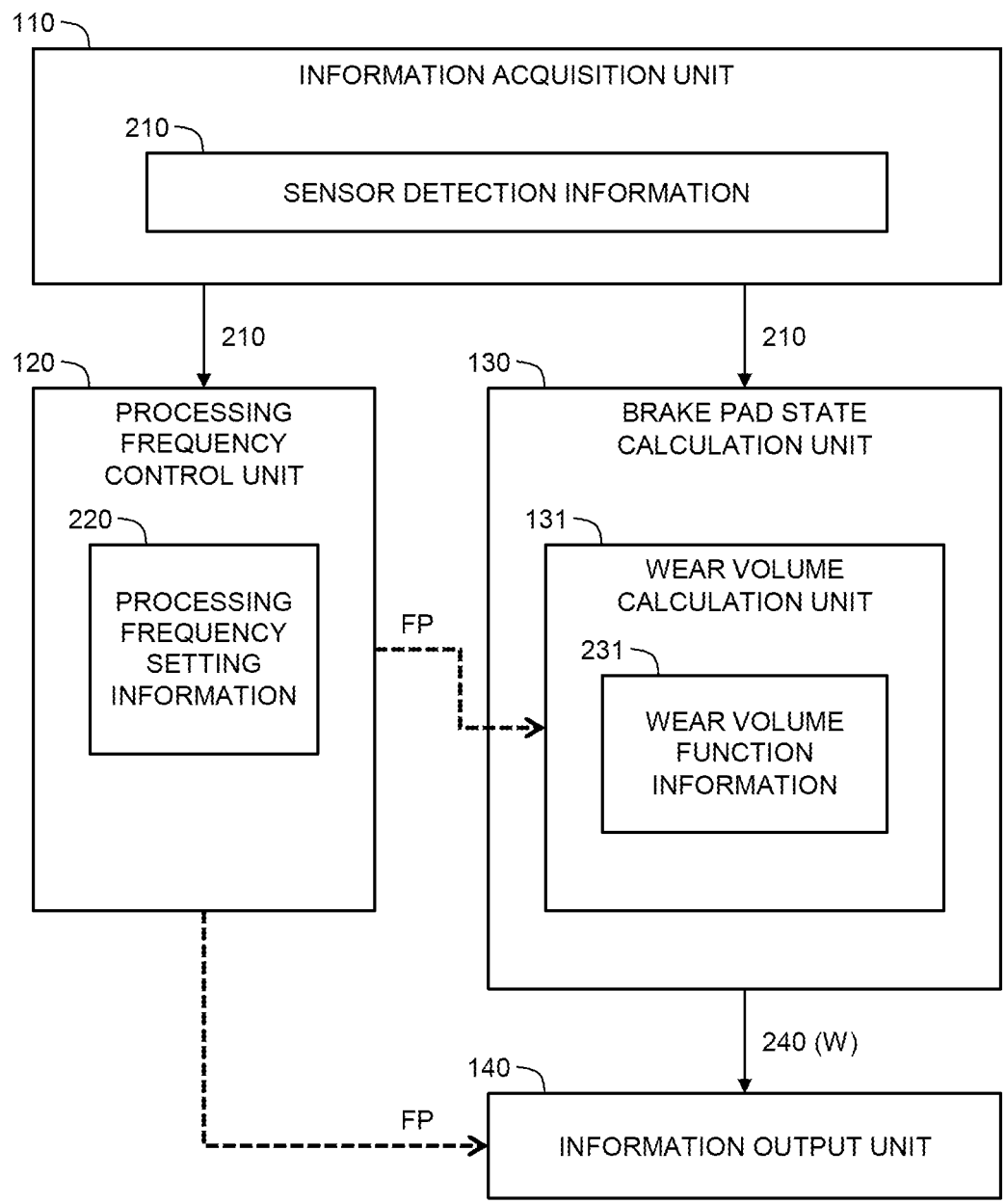
FIG. 6 is a functional block diagram for explaining a first processing example by the brake pad state estimation device according to an embodiment of the present disclosure.

FIG. 6 is a functional block diagram for explaining a first processing example by the brake pad state estimation device 100 according to the present embodiment. The brake pad state estimation device 100 includes an information acquisition unit 110, a processing frequency control unit 120, a brake pad state calculation unit 130, and an information output unit 140. These functional blocks are implemented by the processor 101 executing the brake pad state estimation program 200.

3-1-1. Information Acquisition Process

The information acquisition unit 110 acquires the sensor detection information 210 based on the result of detection by the sensor 50. The sensor detection information 210 includes the vehicle speed V, the brake pressure Pb, and the brake duration tb.

3-1-2. Processing Frequency Control Process

The processing frequency control unit 120 variably sets the processing frequency FP of at least one of the brake pad state calculation process and the information output process. More specifically, the processing frequency control unit 120 receives the sensor detection information 210 from the information acquisition unit 110. Then, based on processing frequency setting information 220, the processing frequency control unit 120 acquires the processing frequency FP that is associated with at least one of the vehicle speed V and the brake pressure Pb indicated by the sensor detection information 210. The processing frequency control unit 120 applies the acquired processing frequency FP to at least one of the brake pad state calculation process and the information output process described below.

3-1-3. Brake Pad State Calculation Process

During the braking of the vehicle 1, the brake pad state calculation unit 130 receives the sensor detection information 210 from the information acquisition unit 110. Then, the brake pad state calculation unit 130 calculates the brake pad state ST based on the sensor detection information 210 and the brake pad state function information 230.

In the example shown in FIG. 6, the brake pad state calculation unit 130 includes a wear volume calculation unit 131 that performs a wear volume calculation process. The brake pad state function information 230 includes wear volume function information 231 indicating the wear volume function f. The wear volume calculation unit 131 uses the wear volume function f to calculate the wear volume W according to the vehicle speed V, the brake pressure Pb, and the brake duration time tb. The wear volume calculation unit 131 may calculate the cumulative wear volume Wt by integrating the wear volume W calculated for each brake operation.

3-1-4. Information Output Process

The information output unit 140 receives the estimated brake pad state information 240 from the brake pad state calculation unit 130. In the example shown in FIG. 6, the estimated brake pad state information 240 includes the wear volume W calculated by the wear volume calculation unit 131. The estimated brake pad state information 240 may include the cumulative wear volume Wt. The information output unit 140 stores the estimated brake pad state information 240 in the storage device 102 and/or transmits the estimated brake pad state information 240 to an external device (e.g., a management server) outside the vehicle 1. If the cumulative wear volume Wt exceeds a threshold value, the information output unit 140 may output an alert through the output device 60 (e.g., a display, a speaker).

3-2. Second Processing Example

Figure 7:
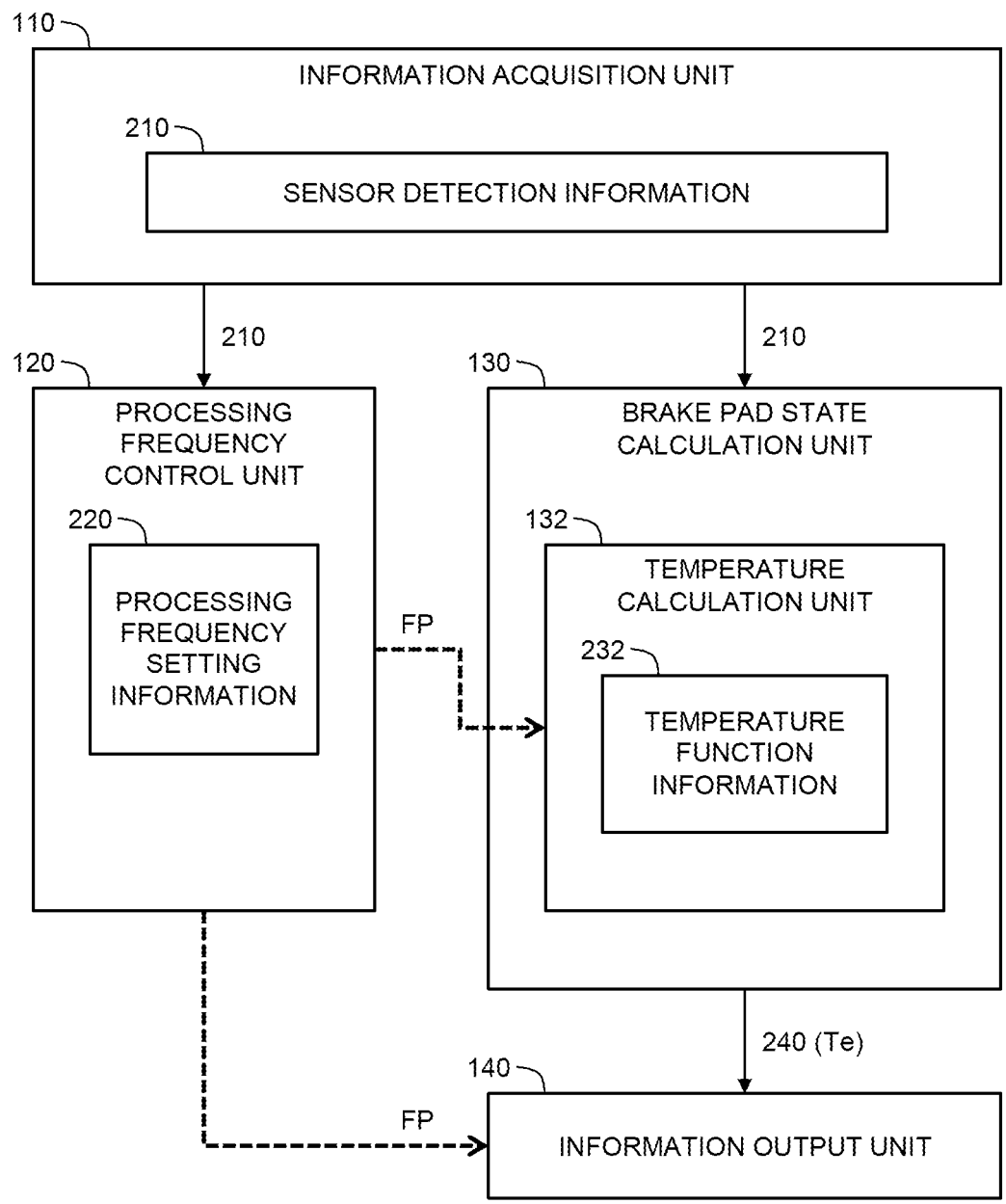
FIG. 7 is a functional block diagram for explaining a second processing example by the brake pad state estimation device according to an embodiment of the present disclosure.

FIG. 7 is a functional block diagram for explaining a second processing example by the brake pad state estimation device 100 according to the present embodiment. An overlapping description with the first processing example will be omitted as appropriate.

In the example shown in FIG. 7, the brake pad state calculation unit 130 includes a temperature calculation unit 132 that performs a temperature calculation process. The brake pad state function information 230 includes temperature function information 232 indicating the temperature function g. The temperature calculation unit 132 uses the temperature function g to calculate the temperature Te of the contact surface 31 according to the vehicle speed V, the brake pressure Pb, and the brake duration tb. The estimated brake pad state information 240 includes the temperature Te calculated by the temperature calculation unit 132.

3-3. Third Processing Example

Figure 8:
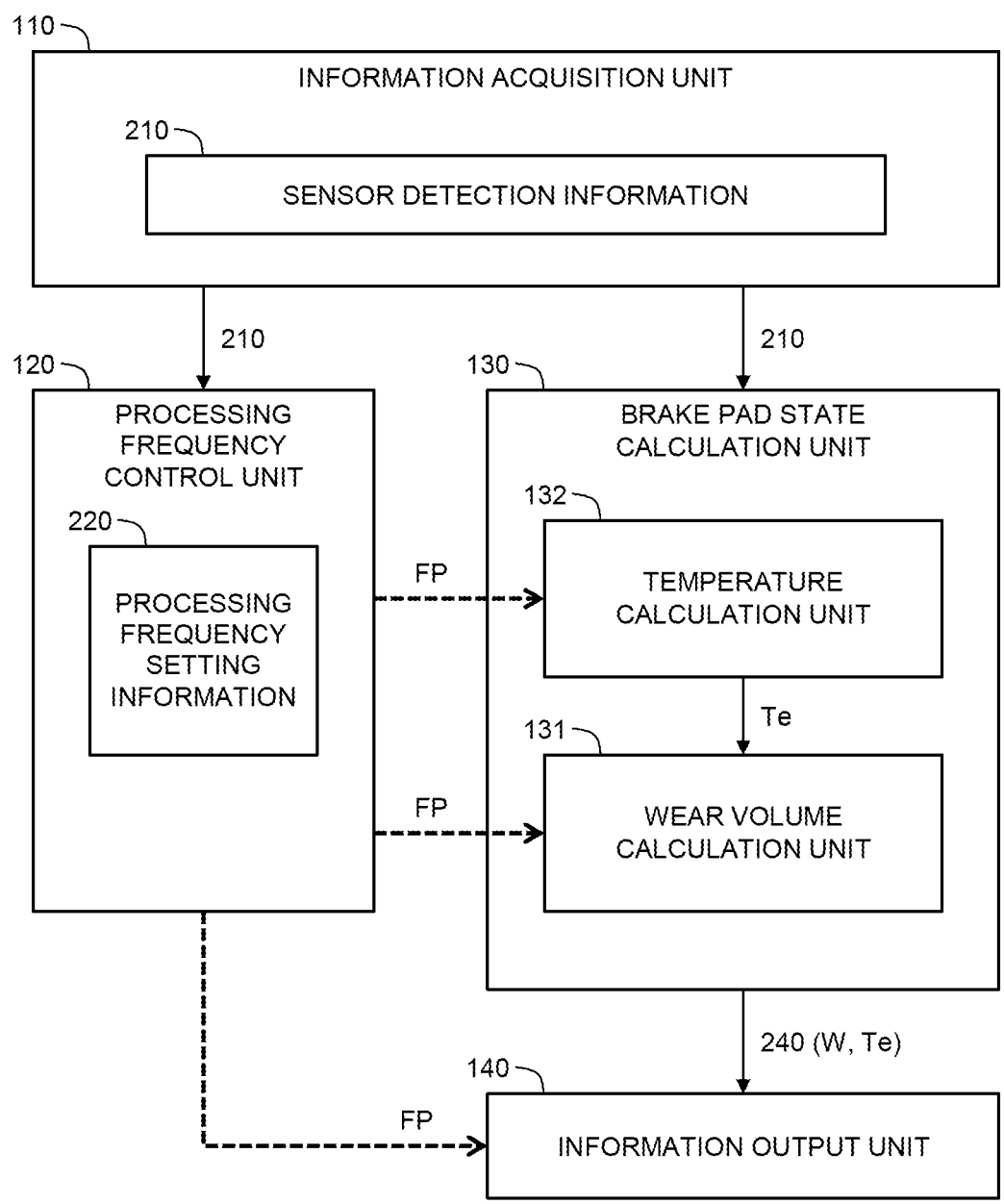
FIG. 8 is a functional block diagram for explaining a third processing example by the brake pad state estimation device according to an embodiment of the present disclosure.

FIG. 8 is a functional block diagram for explaining a third processing example by the brake pad state estimation device 100 according to the present embodiment. An overlapping description with the first and second processing examples will be omitted as appropriate.

In the example shown in FIG. 8, the brake pad state calculation unit 130 includes both the wear volume calculation unit 131 and the temperature calculation unit 132. The brake pad state function information 230 includes the wear volume function information 231 and the temperature function information 232. The temperature calculation unit 132 calculates the temperature Te of the contact surface 31 by using the temperature function g.

The wear volume calculation unit 131 calculates the wear volume W by taking the temperature Te into consideration as well. More specifically, the wear volume function f is designed so that the wear volume W increases as the temperature Te becomes higher. The wear volume calculation unit 131 uses the wear volume function f to calculate the wear volume W according to the vehicle speed V, the brake pressure Pb, the brake duration tb, and the temperature Te. The estimated brake pad state information 240 includes the wear volume W calculated by the wear volume calculation unit 131 and the temperature Te calculated by the temperature calculation unit 132.

3-4. Fourth Processing Example

Figure 9:
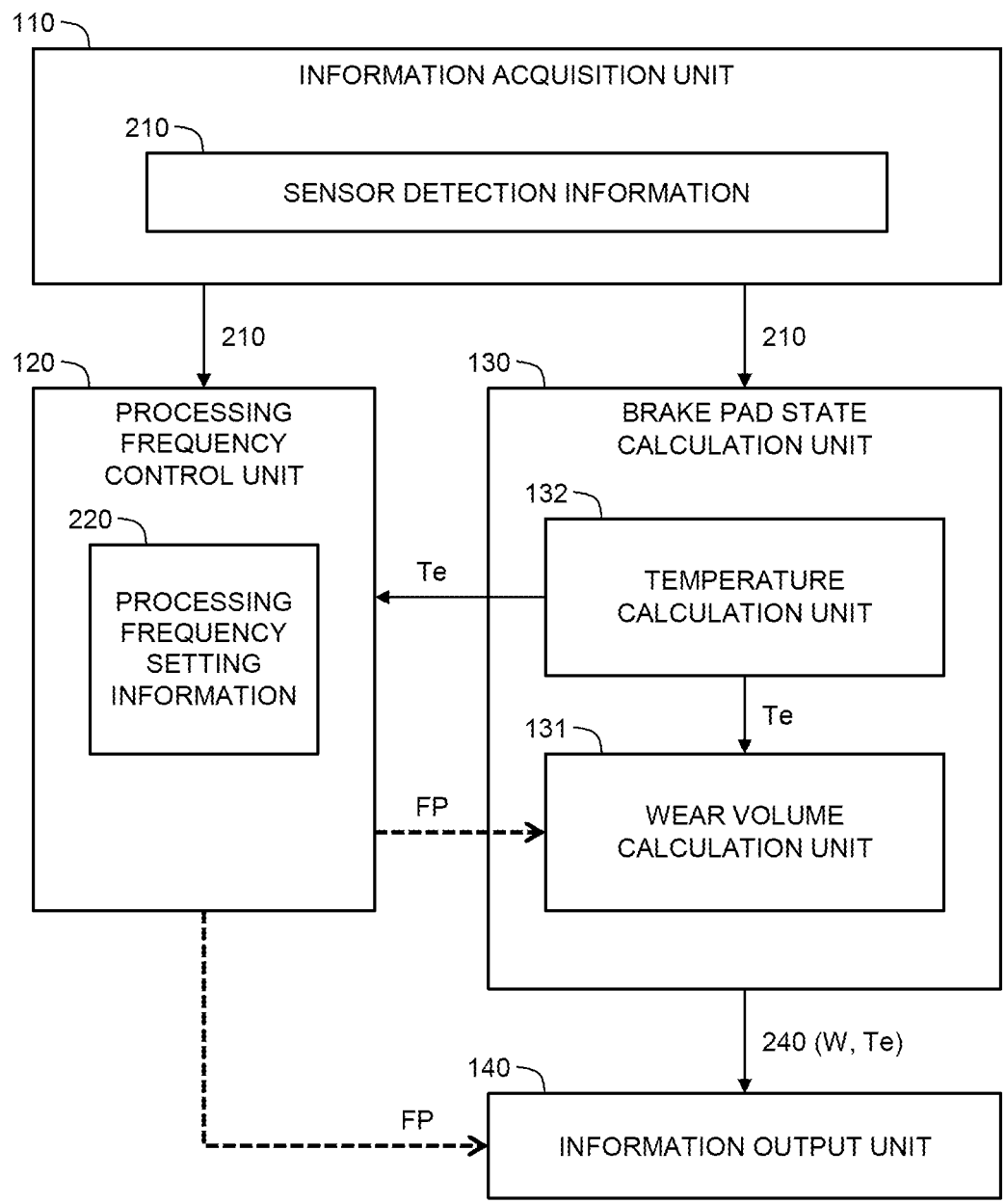
FIG. 9 is a functional block diagram for explaining a fourth processing example by the brake pad state estimation device according to an embodiment of the present disclosure.

FIG. 9 is a functional block diagram for explaining a fourth processing example by the brake pad state estimation device 100 according to the present embodiment. The fourth processing example is a modification example of the third processing example.

In the fourth processing example, the processing frequency setting information 220 associates the temperature Te in addition to at least one of the vehicle speed V and the brake pressure Pb with the processing frequency FP. More specifically, the processing frequency setting information 220 is designed such that the processing frequency FP in a case where the temperature Te is lower is lower than the processing frequency FP in a case where the temperature Te is higher.

The processing frequency control unit 120 receives information on the temperature Te calculated by the temperature calculation unit 132. Based on processing frequency setting information 220, the processing frequency control unit 120 acquires the processing frequency FP that is associated with the temperature Te and at least one of the vehicle speed V and the brake pressure Pb. The processing frequency control unit 120 applies the acquired processing frequency FP to at least one of the brake pad state calculation process (the wear volume calculation process) and the information output process described below.

4. Effects

According to the present embodiment, as described above, the processing frequency FP of at least one of the brake pad state calculation process and the information output process is variably set depending on a situation. More specifically, the processing frequency FP in the case where the vehicle speed V is lower is set to be lower than the processing frequency FP in the case where the vehicle speed V is higher, or the processing frequency FP in the case where the brake pressure Pb is lower is set to be lower than the processing frequency FP in the case where the brake pressure Pb is higher.

That is, the processing frequency FP is set to be low in the case where the impact on the brake performance is low, and the processing frequency FP is set to be high in the case where the impact on the brake performance is high. It is thus possible to suppress the resource consumption in the case where the impact on the brake performance is low, and to calculate the brake pad state ST more precisely in the case where the impact on the brake performance is high. In other words, it is possible to efficiently secure an estimation accuracy of the brake pad state ST without consuming resources more than necessary.

Moreover, according to the present embodiment, it is possible to estimate the brake pad state ST by utilizing the existing sensor 50 (i.e., the brake pressure sensor 51 and the wheel speed sensor 52). This facilitates a cost reduction.

Furthermore, according to the present embodiment, the brake pad state ST is automatically calculated. Thus, a failure of the brake pad 30 can be detected automatically regardless of the driver. The present embodiment may be applied to a case where no fixed driver exists (e.g., automated driving vehicle, car sharing).

What is claimed is:

1. A brake pad state estimation device that estimates a brake pad state including at least one of a wear volume and a temperature of a brake pad of a vehicle, the brake pad state estimation device comprising:
a brake pressure sensor that detects brake pressure of the vehicle;
a wheel speed sensor that detects a vehicle speed of the vehicle;
a processor; and
a storage, wherein the processor is programmed to execute:
an information acquisition process acquiring sensor detection information that includes the vehicle speed detected by the wheel speed sensor and the brake pressure detected by the brake pressure sensor;
a brake pad state calculation process calculating the brake pad state based on the sensor detection information during braking of the vehicle;
an information output process storing a result of calculation of the brake pad state in the storage and/or transmitting the result of calculation of the brake pad state to an outside of the vehicle; and
processing frequency control that variably sets a processing frequency of at least one of the brake pad state calculation process and the information output process, and
in the processing frequency control, the processor is further programmed to set the processing frequency in a case where the vehicle speed is lower to be lower than the processing frequency in a case where the vehicle speed is higher, or to set the processing frequency in a case where the brake pressure is lower to be lower than the processing frequency in a case where the brake pressure is higher.

2. The brake pad state estimation device according to claim 1, wherein
the storage stores processing frequency setting information that associates at least one of the vehicle speed and the brake pressure with the processing frequency,
the processing frequency setting information is designed such that the processing frequency in the case where the vehicle speed is lower is lower than the processing frequency in the case where the vehicle speed is higher, or the processing frequency in the case where the brake pressure is lower is lower than the processing frequency in the case where the brake pressure is higher, and
in the processing frequency control, the processor is further programmed to acquire the processing frequency associated with the at least one of the vehicle speed and the brake pressure, based on the processing frequency setting information.

3. The brake pad state estimation device according to claim 1, wherein
the brake pad state includes the wear volume of the brake pad, and
in the brake pad state calculation process, the processor is further programmed to calculate the wear volume such that the wear volume increases as the vehicle speed becomes higher and the wear volume increases as the brake pressure becomes higher.

4. The brake pad state estimation device according to claim 3, wherein
the processor is further programmed to calculate the temperature of a contact surface of the brake pad that comes in contact with a brake rotor, based on the vehicle speed and the brake pressure, and
in the brake pad state calculation process, the processor is further programmed to calculate the wear volume such that the wear volume increases as the temperature of the contact surface becomes higher.

5. The brake pad state estimation device according to claim 4, wherein
in the processing frequency control, the processor is further programmed to set the processing frequency in a case where the temperature is lower to be lower than the processing frequency in a case where the temperature is higher.

6. The brake pad state estimation device according to claim 1, wherein
the brake pad state includes the temperature of a contact surface of the brake pad that comes in contact with a brake rotor, and
in the brake pad state calculation process, the processor is further programmed to calculate the temperature of the contact surface such that the temperature becomes higher as the vehicle speed becomes higher and the temperature becomes higher as the brake pressure becomes higher.

7. The brake pad state estimation device according to claim 1, wherein
the brake pad state includes the wear volume of the brake pad,
the processor is further programmed to acquire a cumulative wear volume that is an integrated value of the wear volume, based on the wear volume calculated in the brake pad state calculation process, and
the processor is further programmed to output an alert through an output device when the cumulative wear volume exceeds a threshold.

8. A brake pad state estimation method that estimates a brake pad state including at least one of a wear volume and a temperature of a brake pad of a vehicle,
the brake pad state estimation method comprising:
an information acquisition process acquiring sensor detection information that includes a vehicle speed detected by a wheel speed sensor installed on the vehicle and a brake pressure detected by a brake pressure sensor installed on the vehicle;
a brake pad state calculation process calculating the brake pad state based on the sensor detection information during braking of the vehicle;
an information output process storing a result of calculation of the brake pad state in a storage and/or transmitting the result of calculation of the brake pad state to an outside of the vehicle; and
processing frequency control that variably sets a processing frequency of at least one of the brake pad state calculation process and the information output process, wherein
in the processing frequency control, the processing frequency in a case where the vehicle speed is lower is set to be lower than the processing frequency in a case where the vehicle speed is higher, or the processing frequency in a case where the brake pressure is lower is set to be lower than the processing frequency in a case where the brake pressure is higher.

* * * * *